United States Patent [19]

Swart

[11] Patent Number: 5,515,399
[45] Date of Patent: May 7, 1996

[54] APPARATUS AND METHOD FOR WIRELESS DATA AND ENERGY TRANSMISSION

[75] Inventor: Marten Swart, Obertraubling, Germany

[73] Assignee: Siemens Aktiengesellschaft, Munich, Germany

[21] Appl. No.: 217,584

[22] Filed: Mar. 24, 1994

[30]     Foreign Application Priority Data

Mar. 24, 1993  [EP]  European Pat. Off. .............. 93104888

[51] Int. Cl.⁶ .............................. H04B 3/00; H04L 25/00
[52] U.S. Cl. ........................... 375/258; 333/177; 455/41; 379/55
[58] Field of Search .................................. 375/257, 258, 375/219; 455/41; 333/177; 363/21; 379/55

[56]                    References Cited

U.S. PATENT DOCUMENTS

| | | | |
|---|---|---|---|
| 4,799,236 | 1/1989 | Janssen ................................... | 375/258 |
| 5,293,400 | 3/1994 | Monod et al. ............................ | 455/41 |

FOREIGN PATENT DOCUMENTS

| | | | |
|---|---|---|---|
| 0160990 | 11/1985 | European Pat. Off. .................. | 455/41 |
| 0183580 | 6/1986 | European Pat. Off. . | |
| 0348818 | 1/1990 | European Pat. Off. . | |
| 0451445 | 10/1991 | European Pat. Off. .................. | 455/41 |
| 0528463 | 2/1993 | European Pat. Off. . | |
| 4031827 | 4/1992 | Germany . | |
| 4101163 | 5/1992 | Germany . | |
| 4120650 | 12/1992 | Germany . | |

OTHER PUBLICATIONS

Japanese Patent Abstract No. 58-115945 (Fukusono), dated Jul. 9, 1983.

Primary Examiner—Stephen Chin
Assistant Examiner—Don Vo
Attorney, Agent, or Firm—Herbert L. Lerner; Laurence A. Greenberg

[57]                    ABSTRACT

An apparatus for the wireless transmission of energy and data includes a transformer with two sides for transmitting energy in one direction and data in both directions. A circuit on both of the sides of the transformer controls and evaluates a course of the transmission. In a method for controlling and evaluating the apparatus, a primary-side switching path is interrupted for transmitting energy from the primary side to the secondary side. Data are transmitted from the primary side to the secondary side during an energy storage phase by briefly interrupting a primary-side switching path. Data are transmitted from the secondary side to the primary side in a period during an energy storage phase by a secondary-side load pulse. An information transmission is controlled with a trigger and evaluation device on the primary side and on the secondary side. The information both on the primary side and on the secondary side is evaluated in the trigger and evaluation device each communicating with a respective processor.

18 Claims, 5 Drawing Sheets

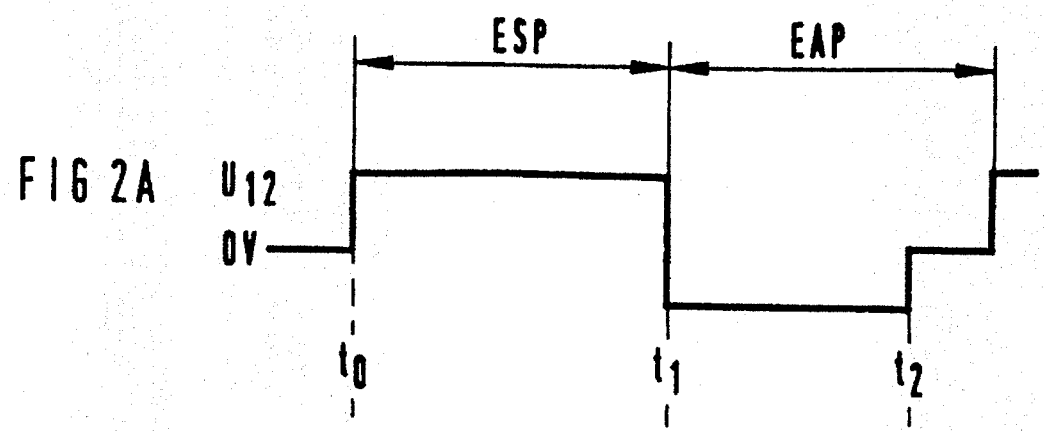
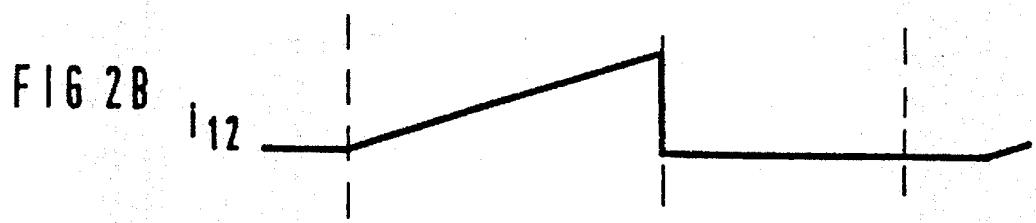
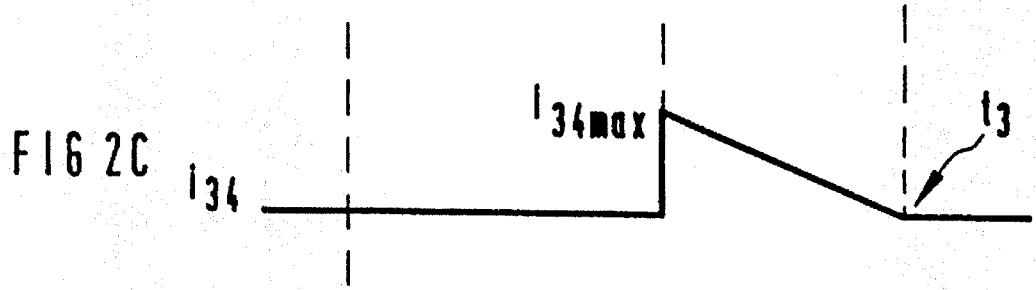
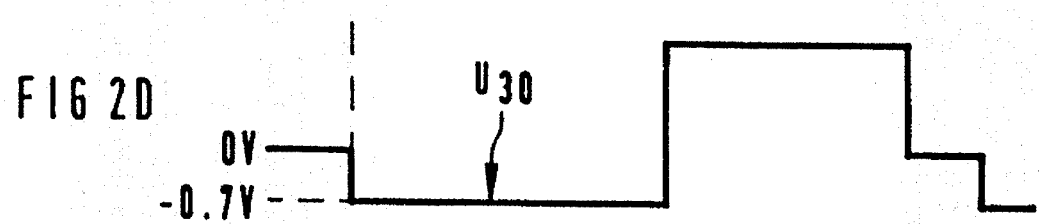
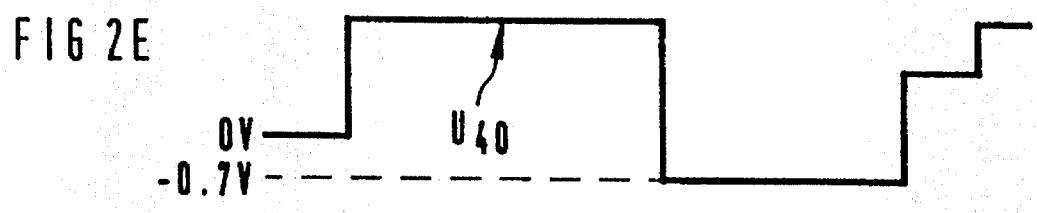

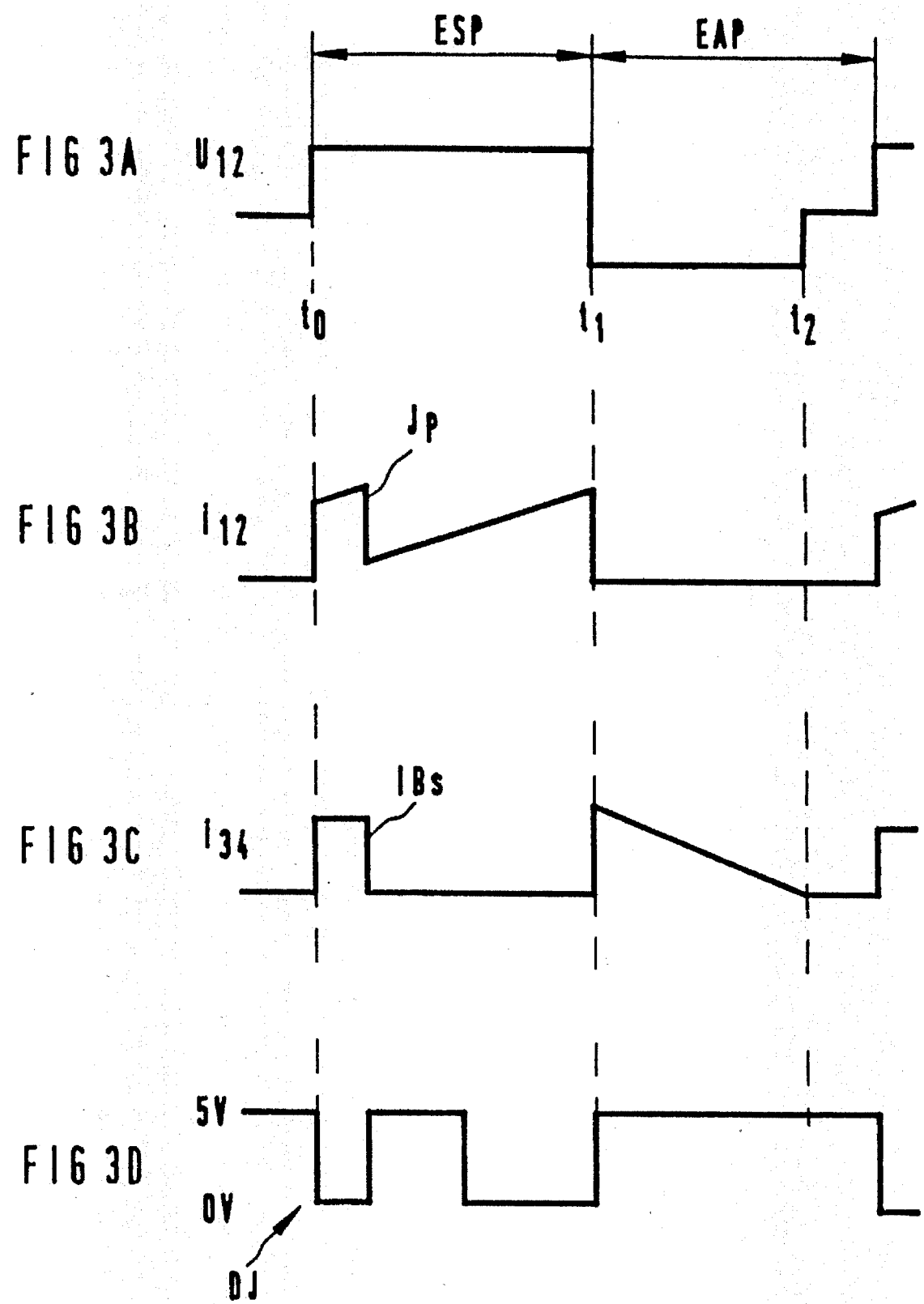

APPARATUS AND METHOD FOR WIRELESS DATA AND ENERGY TRANSMISSION

BACKGROUND OF THE INVENTION

FIELD OF THE INVENTION

The invention relates to an apparatus for the wireless transmission of both energy and data and to a method for controlling and evaluating the transmission.

The transmission of energy from a stationary part to a moving part, for instance for driving circuit elements or for positioning a robot arm, have heretofore been largely carried out through electrical lines.

Energy from a steering column to a steering wheel in automotive engineering, for instance, has previously been transmitted through wiper contacts or a winding spring. Naturally, data may also be transmitted over such a path. The disadvantage of that sort of transmission, among others, is heavy wear to the parts, and possibly the generation of unpleasant noise or the sensitivity to mechanical decelerations or delays or the sensitivity to mechanical accelerations.

SUMMARY OF THE INVENTION

It is accordingly an object of the invention to provide an apparatus and a method for wireless data and energy transmission, which overcome the hereinafore-mentioned disadvantages of the heretofore-known devices and methods of this general type and with which a transmission of both energy and data is reliably possible.

With the foregoing and other objects in view there is provided, in accordance with the invention, an apparatus for the wireless transmission of energy and data, comprising a transformer with two sides for transmitting energy in one direction and data in both directions; and circuit means on both of said sides of said transformer for controlling and evaluating a course of the transmission.

In accordance with another feature of the invention, the transformer has a primary-side winding and a secondary-side winding with opposed directions of winding, one of said windings is stationary in said transformer and the other of said windings is movable relative thereto.

In accordance with a further feature of the invention, the secondary-side winding has winding terminals; and there is provided a diode having an anode connected to one of said winding terminals; a voltage regulator to which said diode is connected in the conducting direction; a further diode having a cathode connected to the one winding terminal; an additional diode having a cathode connected to the other of said winding terminals; a resistor and a switching transistor connected between the other winding terminal and a secondary-side ground; and trigger and evaluation means being connected to said winding terminals and to said switching transistor for controlling said switching transistor.

In accordance with an added feature of the invention, the stationary winding is connected to a steering column of a motor vehicle, and said moving winding is connected to a steering wheel of the motor vehicle.

In accordance with an additional feature of the invention, the primary winding of said transformer is associated with a chassis of the motor vehicle, and said secondary winding is associated with the steering wheel.

With the objects of the invention in view, there is also provided, in a method for controlling and evaluating an apparatus for the wireless transmission of energy and data having a transformer with primary and secondary sides and a primary-side switching path being interrupted for transmitting energy from the primary side to the secondary side, the improvement which comprises transmitting data from the primary side to the secondary side during an energy storage phase by briefly interrupting a primary-side switching path; transmitting data from the secondary side to the primary side in a period during an energy storage phase by a secondary-side load pulse; controlling an information transmission with trigger and evaluation means on the primary side and on the secondary side; and evaluating the information both on the primary side and on the secondary side in the trigger and evaluation means each communicating with a respective processor.

In accordance with another mode of the invention, there is provided a method which comprises developing a current pulse in the primary winding by transmitting the data from the secondary side to the primary side with the load pulse on the secondary side, and evaluating the pulse in a comparator in the trigger and evaluation means.

In accordance with a further mode of the invention, there is provided a method which comprises measuring the voltage through the processor at a voltage divider formed by resistors on the secondary side, transmitting the voltage as data information to the primary side, and regulating the voltage.

In accordance with an added mode of the invention, there is provided a method which comprises controlling the load with the trigger and evaluation means on the secondary side for transmitting the data serially.

In accordance with an additional mode of the invention, there is provided a method which comprises adjusting a switching frequency to be the same on the primary side and on the secondary side, and transmitting the data in a range of approximately 125 kHz.

In accordance with yet another mode of the invention, there is provided a method which comprises transmitting data from the primary side to the secondary side during the energy storage phase, by briefly interrupting the voltage pulse on the primary side resulting in a brief opposite-side phase voltage pulse at the secondary winding, and evaluating a resultant current as data information in a comparator in the secondary-side trigger and evaluation means.

In accordance with yet a further mode of the invention, there is provided a method which comprises pre-defining the instant of interruption of the primary side, on the secondary side.

In accordance with yet an added mode of the invention, there is provided a method which comprises adjusting the instants of voltage interruption on the primary side so as not to coincide chronologically with the instant of the load pulse on the secondary side.

In accordance with yet an additional mode of the invention, there is provided a method which comprises adjusting the instants so as to occur in the same switching phase.

In accordance with again another mode of the invention, there is provided a method which comprises synchronizing the primary side with the secondary side for transmission of the data in at least one direction.

In accordance with again a further mode of the invention, there is provided a method which comprises utilizing a positive edge at an onset of the energy storage phase, for synchronization.

In accordance with again an added mode of the invention, there is provided a method which comprises utilizing one of two edges of a pulse created upon the primary-side interruption of the switching path, for synchronization.

In accordance with again an additional mode of the invention, there is provided a method which comprises subdividing the data pulse into a synchronizing pulse and an information pulse.

In accordance with a concomitant mode of the invention, there is provided a method which comprises transmitting the data only in every other period, for enlarging a control range of energy transmission. German Published, Non-Prosecuted Application DE 41 20 650 A1 discloses an apparatus for transmitting electrical energy and data in motor vehicles, in which the energy required in the steering wheel is transmitted inductively through coils of a transformer. The primary coil is triggered by a switch, so that after actuation magnetic energy builds up, which is discharged after shutoff in the secondary coil, that is carried to a capacitor and a consumer. On the steering wheel side, the electrical energy is converted into a direct voltage through a rectifier circuit and regulated by the electronics on the steering wheel side. The magnitude of the power transmitted is determined by the ratio between the ON time and OFF time of the switch. In regulated operation, only as much energy as is needed on the steering wheel side is transmitted. That is done by switching back and forth between different pulse widths.

The data from the steering wheel side to the driver side or from the driver side to the steering wheel is transmitted through a capacitor that is independent of the inductive energy transmission. On the vehicle and steering wheel side, the capacitor is connected to identical trigger and evaluation circuits, since data is transmitted in both directions. The capacitor is disposed coaxially to the transformer.

However, that apparatus has the disadvantage of requiring two parallel transmission paths, in order to transmit the energy over one path and the data over another path.

The great advantage of the invention over the known apparatus is that a second transmission path can be dispensed with. During the energy transmission phase, data can moreover be transmitted in both directions practically simultaneously, or in other words with only a brief interruption in energy storage, which lowers the hardware cost of such transmission. This so-called inter-nested transmission can naturally also be carried out during the energy output phase, although at the sacrifice of the advantage of being able to also transmit energy during information transmission.

Other features which are considered as characteristic for the invention are set forth in the appended claims.

Although the invention is illustrated and described herein as embodied in an apparatus and a method for wireless data and energy transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS:

FIGS. 2A–2E are graphs showing courses of current and voltage on primary and second sides of the transformer during an energy storage phase and an energy output phase;

FIGS. 3A–3D are graphs showing courses of information transmission from the secondary side to the primary side;

Figure 1:
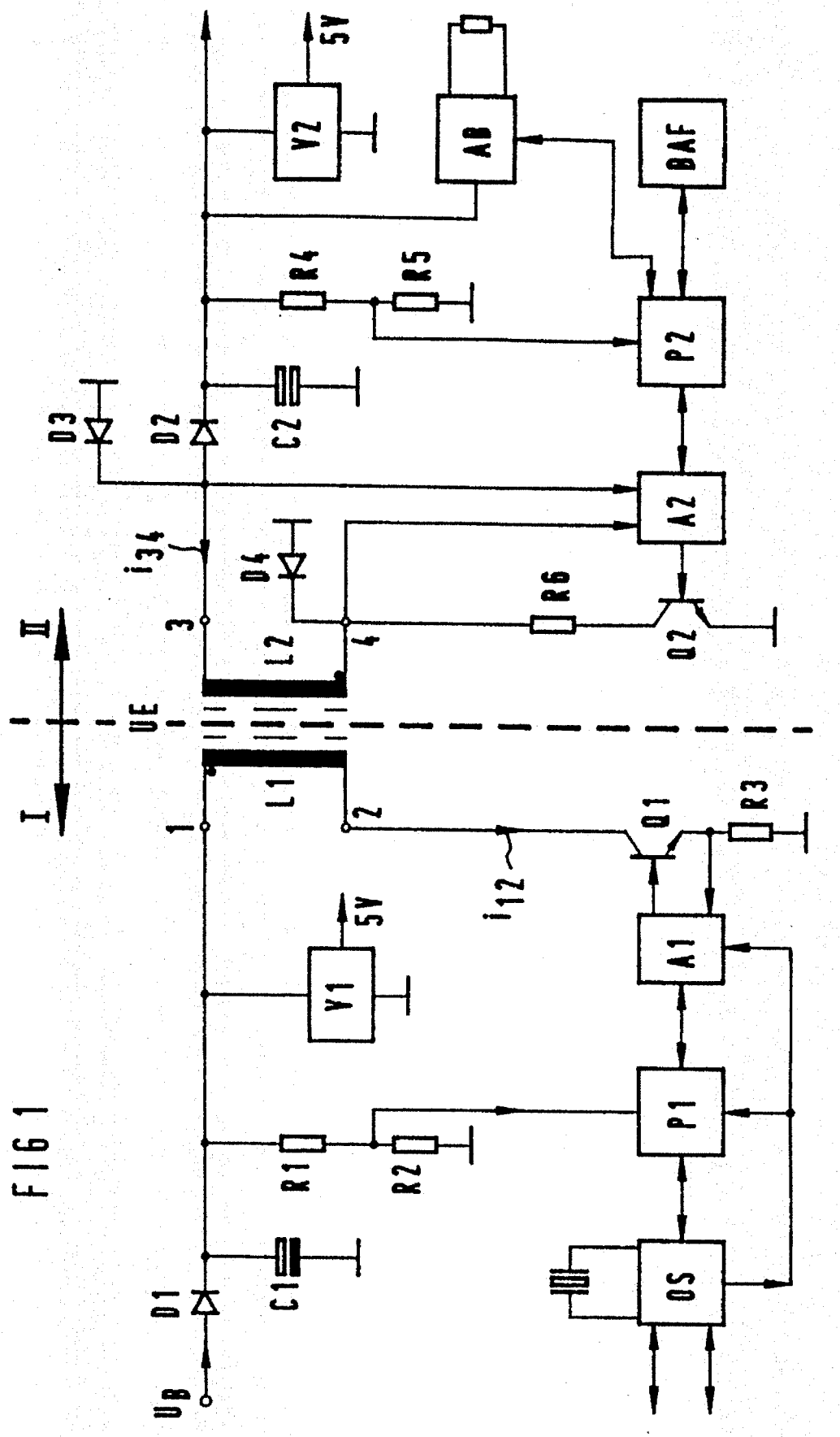
FIG. 1 is a block diagram of a circuit for transmitting energy and information data through a transformer.

DESCRIPTION OF THE PREFERRED EMBODIMENTS:

Referring now to the figures of the drawing in detail and first, particularly, to FIG. 1 thereof, there is seen a circuit configuration including a transformer UE having a primary-side (I) first winding L1 with terminals 1 and 2 and a secondary-side (II) second winding L2, being disposed counter to the winding direction of the winding L1 and having terminals 3 and 4. The transformer UE separates components disposed on the primary side from electrical components disposed on the secondary side.

On the primary side I, a supply voltage $U_B$ is applied to a diode D1, which serves as protection against mispolarizing and prevents a possibly incorrectly polarized supply voltage from being supplied. An adjacent capacitor C1 serves to smooth the voltage $U_B$. Two series-connected resistors R1, R2, which are carried to ground and form a voltage divider, are connected to the terminal 1 of the winding L1. A junction between the resistors R1 and R2 is connected to a processor P1, which monitors the supply voltage. A 5-volt regulator V1 which is also provided is likewise connected to both the terminal 1 of the winding L1 and to ground and furnishes a regulated voltage to the processor P1 as well as to a trigger and evaluation logic A1 and a CAN or ABUS interface OS. The processor P1 and the trigger and evaluation logic A1 are connected to one another by a bus. The oscillator of the CAN or ABUS interface OS clocks the processor P1 and the trigger and evaluation logic A1.

Connected to the terminal 2 of the winding L1 is a switch transistor Q1 and a resistor R3 that is connected in series with the switch transistor Q1 and ends at ground. The switch transistor Q1 is switched by the trigger and evaluation logic A1, which also evaluates the current $i_{12}$ flowing through the winding L1.

On the secondary side II, the terminal 3 of the winding L2 is also connected through a diode D2 and a smoothing capacitor C2, to a 5-volt regulator V2, a voltage divider R4, R5 with a junction between resistors R4 and R5 that is connected to a processor P2, and to an airbag AB. A control and display field BAF and a trigger and evaluation logic A2 which are also provided, communicate with one another through buses. The trigger and evaluation logic A2 is connected to both the terminal 3 and the terminal 4 of the winding L2. Diodes D3 and D4 for voltage limitation are also connected to these terminals. The terminal 4 of the winding L2 is connected through a resistor R6 and an adjacent switch transistor Q2 to a secondary-side ground, and the switch transistor Q2 is controlled by the trigger and evaluation logic A2.

FIG. 2 shows the course of current and voltage on the primary and secondary sides of the transformer during an energy storage phase ESP and an energy output phase EAP.

FIG. 2A shows the voltage course at the primary winding L1. The voltage U12 between the terminals 1, 2 of the winding L1 initially amounts to 0 V, when the transistor Q1 is not conducting. The transistor Q1 is conducting at a time $t_0$, whereupon the voltage $U_{12}$ at the winding L1 is established. FIG. 2B shows the course of current in the primary winding L1. The current $i_{12}$ in the winding L1 rises linearly from time the $t_0$ to a time $t_1$. The current is detected from the voltage across the resistor R3 and is switched off if the maximum value is exceeded as in FIG. 2B.

In FIG. 2C, which shows the course of current in the secondary winding L2, a current $i_{34}$ in the winding L2 is zero on the secondary side II. During the energy storage phase, the diode D3 is conducting and the diode D4 blocks, so that a positive voltage pulse relative to the secondary ground is created at the terminal 4. This makes it possible to load the transformer with the resistor R6 and the transistor Q2 during this phase, without requiring a negative voltage. The diodes D2 and D4 are conducting during the energy output phase, and the stored energy can be output. This circuit configuration does not require any second secondary winding.

At the time $t_1$, the transistor Q1 again becomes non-conducting. The voltage $U_{12}$ present at the winding L1 thus becomes negative after the shutoff. The current $i_{12}$ in the winding L1 drops to 0 A. As a result of this change in current and voltage on the primary side I, the current $i_{34}$ in the winding L2 on the secondary side II surges to its maximum value $i_{34}$max. The voltages shown in FIGS. 2D and 2E are thus located at the secondary winding L2. The current $i_{34}$ then drops linearly down to 0 A, and at a time $t_3$ at which the energy has been output, which depends on the duration of the energy storage phase between the times $t_0$ and $t_1$ and on the load on the secondary side. The capacitor C2 keeps the voltage at the secondary winding L2 at approximately the same level (after the time $t_1$), and as a result the 5-volt regulator is supplied continuously. The diode D2 prevents a current from flowing in the opposite direction, that is toward the winding L2, during the energy storage phase.

Accordingly, during the energy storage phase ESP, the transistor Q1 is in the ON position (conducting), and the transistor Q2 is in the OFF position (non-conducting), while conversely during the energy output phase EAP, the transistor Q1 is also in the OFF position. This applies only as long as no information is being transmitted. The control for that purpose is performed in the primary-side trigger and evaluation logic A1 and the secondary-side trigger and evaluation logic A2, and the duration of the energy storage phase ESP depends on the energy needed on the secondary side II.

The transmission of information from the secondary side II to the primary side I during the energy storage phase ESP will be described below while referring to FIGS. 3A–3D.

As is already shown in FIG. 2A, during the energy storage phase ESP, the voltage $U_{12}$ at the primary winding L1 and the current $i_{34}$ in the secondary winding are zero (FIG. 2C). During this phase, information is supposed to be transmitted from the secondary side II to the primary side I. To that end, the secondary-side transistor Q2 is briefly turned on (conducting), causing a current load pulse IBs to arise because of the load in the secondary winding L2 (FIG. 3C). This current load pulse IBs is then superimposed on the rising current in the primary winding L1 (FIG. 3B), producing a current pulse Ip (FIG. 3B) in the primary winding L1. This pulse Ip is then evaluated in the trigger and evaluation logic A1. In other words, it is supplied to a non-illustrated comparator in this logic A1, and as a result data information DI shown in FIG. 3D is created. FIG. 3D shows the current evaluation on the primary side I using a comparator.

The transmission of information from the primary side to the secondary side during the energy storage phase is described below in conjunction with FIGS. 4A–4D.

Figure 4A:
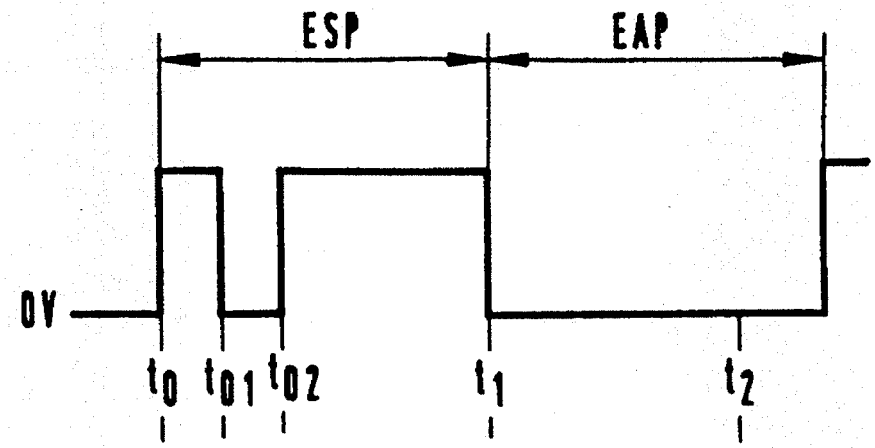
FIGS. 4A–4D are graphs showing courses of information transmission from the primary side to the secondary side.
Figure 4B:
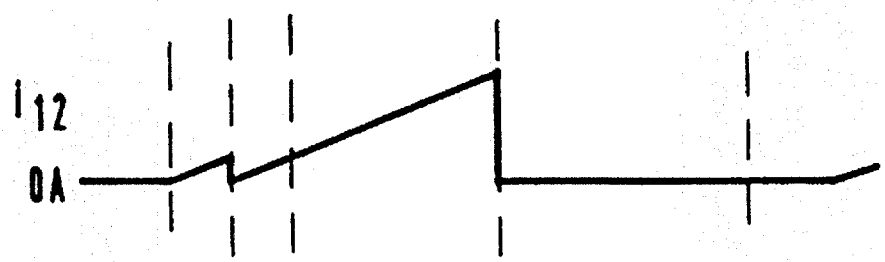
Figure 4C:
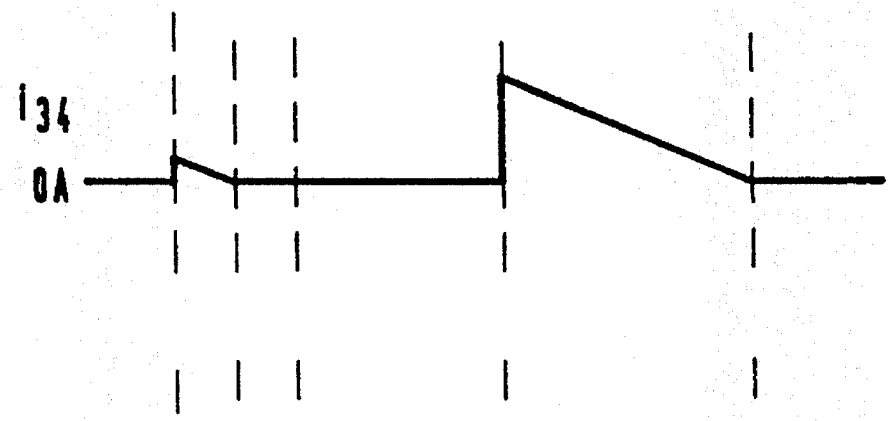
Figure 4D:
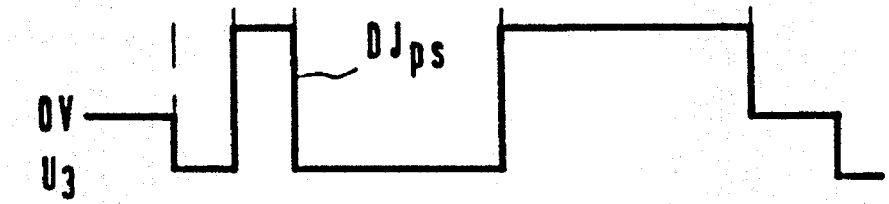

FIG. 4A shows the course of voltage at the primary winding L1 between the terminals 1 and 2. FIG. 4B shows the course of the current $i_{12}$ in the primary winding L1. FIG. 4C shows the course of current in the secondary winding L2 and FIG. 4D shows the course of voltage at the secondary winding at the terminal 3.

As FIG. 4A shows, the energy storage phase is briefly interrupted in the time interval from a time $t_{01}$ to a time $t_{02}$. In other words, the trigger and evaluation logic A1 transmits a command to the transistor Q1 to open briefly (Q1 is non-conducting). In this interval, the current in the primary winding thus drops to 0 (FIG. 4B). This produces the current course in the secondary winding L2 in the interval between the times $t_{01}$ and $t_{02}$ shown in FIG. 4C, which leads to a voltage jump in FIG. 4D as compared with that shown in FIG. 3D, which is evaluated on the secondary side as data information in the trigger and evaluation logic A2.

If a provision is then made so that the voltage interruption (FIG. 4A) on the primary side I and the current load pulse on the secondary side II do not coincide chronologically, then the transmission path can be operated in the full duplex mode. The transmission path has very low impedance and therefore is not vulnerable to interference.

In order to carry out information transmission, the secondary side must be synchronized with the primary side. In order to provide an explanation, reference is made below to FIG. 5. There are various options for synchronization.

Figure 5A:
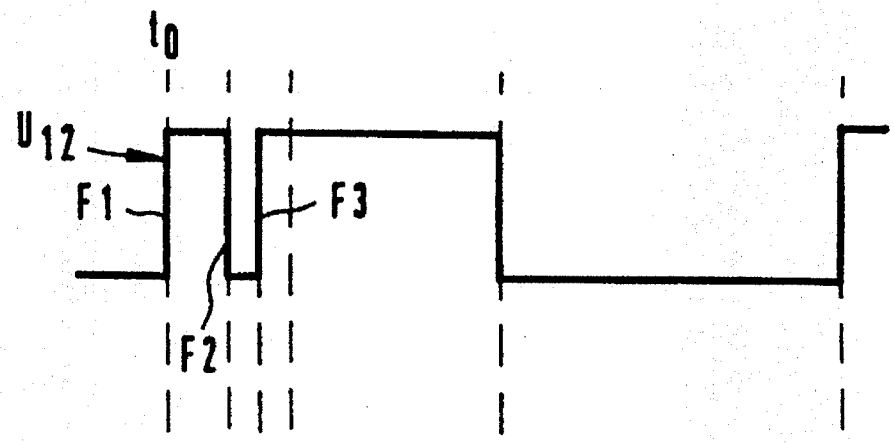
FIGS. 5A and 5B are graphs showing courses of voltage at the primary winding with different synchronization options.

A first option is to utilize the positive edge F1 at the time $t_0$ shown in FIG. 5A. In that case, however, it is a prerequisite to ensure that natural vibration of the transformer does not overly falsify this edge.

A second option is to output a synchronizing pulse during the energy storage phase $t_0$ in FIG. 5A, and both the positive and negative edges F2, F3 can be used for synchronization.

Figure 5B:
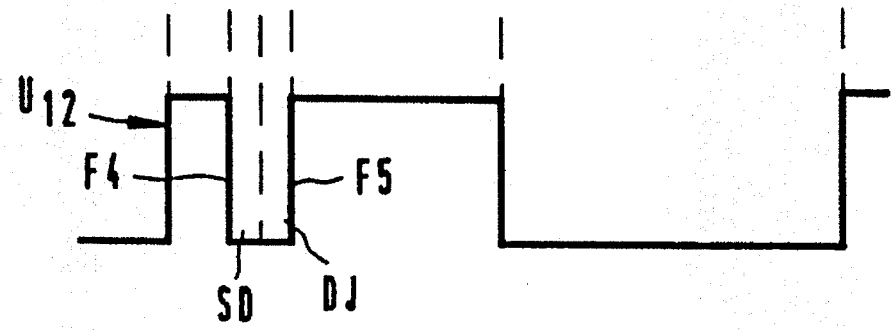

If information is to be transmitted from the primary side to the secondary side, then there is another option for synchronization shown in FIG. 5B, which is to divide the data information into a synchronizing pulse ID and data information DI, with a chronologically predetermined spacing between them, as a result of which the two edges F4, F5 are available for synchronization.

I claim:

1. An apparatus for the wireless transmission of energy and data, comprising:

a transformer for transmitting energy in one direction and data in both directions, said transformer having a primary-side winding and a secondary-side winding with winding terminals;

circuit means connected to each of said windings of said transformer for controlling and evaluating a course of the transmission;

a diode having an anode connected to one of said winding terminals of said secondary-side winding; a voltage regulator to which said diode is connected in the conducting direction; a further diode having a cathode connected to the one winding terminal; an additional diode having a cathode connected to the other of said winding terminals; a resistor and a switching transistor connected between the other winding terminal and a secondary-side ground; and trigger and evaluation means connected to said winding terminals and to said switching transistor for controlling said switching transistor.

2. The apparatus according to claim 1, wherein said primary-side and secondary-side windings of said transformer have mutually opposed directions of winding, and one of said windings is stationary in said transformer and the other of said windings is movable relative thereto.

3. The apparatus according to claim 2, wherein said stationary winding is connected to a steering column of a motor vehicle, and said moving winding is connected to a steering wheel of the motor vehicle.

4. The apparatus according to claim 1, wherein said primary winding of said transformer is associated with a chassis of the motor vehicle, and said secondary winding is associated with the steering wheel.

5. A method for controlling and evaluating an apparatus for the wireless transmission of energy and data having a transformer with primary and secondary sides and a primary-side switching path, which comprises:

connecting the primary-side switching path for storing energy at the primary side during an energy storage phase, and interrupting the primary-side switching path for transmitting energy from the primary side to the secondary side during an energy transfer phase;

transmitting data from the primary side to the secondary side during the energy storage phase by briefly interrupting the primary-side switching path;

transmitting data from the secondary side to the primary side in a period during the energy storage phase by a secondary-side load pulse;

controlling an information transmission with trigger and evaluation means on the primary side and on the secondary side; and evaluating the information both on the primary side and on the secondary side in the trigger and evaluation means each communicating with a respective processor.

6. The method according to claim 5, which comprises developing a current pulse in the primary winding by transmitting the data from the secondary side to the primary side with the load pulse on the secondary side, and evaluating the current pulse in a comparator in the trigger and evaluation means.

7. The method according to claim 5, which comprises measuring, with the processor, a voltage at a voltage divider formed by resistors on the secondary side, transmitting the voltage as data information to the primary side, and regulating the voltage.

8. The method according to claim 6, which comprises controlling a load with a trigger and evaluation means on the secondary side for transmitting the data serially.

9. The method according to claim 8, which comprises adjusting a switching frequency to be the same on the primary side and on the secondary side, and transmitting the data in a range of approximately 125 kHz.

10. The method according to claim 5, which comprises adjusting the instants of voltage interruption on the primary side so as not coincide chronologically with the instant of the load pulse on the secondary side.

11. The method according to claim 10, which comprises adjusting the instants so as to occur in the same switching phase.

12. The method according to claim 5, which comprises transmitting the data only in every other period, for enlarging a control range of energy transmission.

13. The method according to claim 5, which comprises synchronizing the primary side with the secondary side for transmission of the data in at least one direction.

14. In a method for controlling and evaluating an apparatus for the wireless transmission of energy and data having a transformer with primary and secondary sides and a primary-side switching path being interrupted for transmitting energy from the primary side to the secondary side, the improvement which comprises:

transmitting data from the primary side to the secondary side during an energy storage phase by briefly interrupting a primary-side switching path;

transmitting data from the secondary side to the primary side in a period during an energy storage phase by a secondary-side load pulse;

controlling an information transmission with trigger and evaluation means on the primary side and on the secondary side;

evaluating the information both on the primary side and on the secondary side in the trigger and evaluation means each communicating with a respective processor;

transmitting data from the primary side to the secondary side during the energy storage phase, by briefly interrupting the voltage pulse on the primary side resulting in a brief opposite-side phase voltage pulse at the secondary winding, and evaluating a resultant current as data information in a comparator in the secondary-side trigger and evaluation means.

15. The method according to claim 14, which comprises pre-defining the instant of interruption of the primary side, on the secondary side.

16. The method according to claim 13, which comprises utilizing a positive edge at an onset of the energy storage phase, for synchronization.

17. The method according to claim 13, which comprises utilizing one of two edges of a pulse created upon the primary-side interruption of the switching path, for synchronization.

18. The method according to claim 13, which comprises subdividing the data pulse into a synchronizing pulse and an information pulse.

* * * * *